United States Patent
Ash et al.

[11] Patent Number: 5,956,396
[45] Date of Patent: Sep. 21, 1999

[54] CLASS-OF-SERVICE AUTOMATIC ROUTING

[75] Inventors: Gerald Richard Ash, West Long Branch; Sanjeev K. Deora, Iselin, both of N.J.

[73] Assignee: AT&T Corp, New York, N.Y.

[21] Appl. No.: 08/827,966

[22] Filed: May 6, 1997

[51] Int. Cl.⁶ .............................. H04M 7/00; H04M 3/00
[52] U.S. Cl. ........................ 379/220; 379/222; 379/224; 379/229; 379/243
[58] Field of Search ...................... 379/219, 220, 379/221, 222, 224, 229, 230, 242, 243

[56] References Cited

U.S. PATENT DOCUMENTS

| | | | |
|---|---|---|---|
| 5,101,451 | 3/1992 | Ash et al. | 379/221 |
| 5,392,344 | 2/1995 | Ash et al. | 379/221 |
| 5,559,877 | 9/1996 | Ash et al. | 379/221 |
| 5,740,239 | 4/1998 | Bhagat et al. | 379/220 X |

*Primary Examiner*—Harry S. Hong
*Attorney, Agent, or Firm*—Robert B. Levy

[57] ABSTRACT

Local/toll dynamic routing integration is achieved within a telecommunications network (14) that includes at least one dynamic routing local switching system (24-1) for receiving incoming call and a plurality of toll switching systems (27-1 through 27-7) at least one of which is associated with each local switching system. For each incoming call, the local switching system (24-1) derives a set of Class-Of-Service (COS) parameters indicative of the class-of service associated with the call. In accordance with the COS parameters, the local switching system (24-1) determines whether each incoming call is a featured call, requiring routing to the toll switching system associated therewith, or a non-featured call. Featured calls are routed to the toll switching system associated with the local switching system for feature processing, whereas non-featured calls are routed by the local switching system itself in accordance with the COS parameters, thus relieving the load on the associated toll switching system.

18 Claims, 2 Drawing Sheets

CLASS-OF-SERVICE AUTOMATIC ROUTING

TECHNICAL FIELD

This invention relates to a method and apparatus for routing telephone calls within a telecommunications network.

BACKGROUND ART

Present-day telecommunications networks typically include one or more Local Exchanges Carriers (LECs) that provide local telephone service, i.e. dial tone, to subscribers. Each LEC has at least one local office switching system at which calls originate and terminate. The LECs lying within a given Local Access Transport Area (LATA) are interconnected so that a call originating at one LEC can terminate at another LEC in the same LATA. Calls originating at a LEC within one LATA destined for a LEC within another LATA, are typically carried by an Inter-eXchange Carrier (IXC), such as by AT&T. Additionally, an IXC typically processes featured calls (i.e., those requiring certain types of processing, such as 500, 700, 800, 888 calls; Operator calls; and local calls associated with Loop resale, for example). A typical IXC network, such as IXC network maintained by AT&T, includes a plurality of interconnected toll switching systems, and one or more data bases in the form of Service Control Points (SCPs), known as Network Control Points (NCPs) within the AT&T network, each containing information regarding call processing.

Presently, all inter-LATA and international toll calls and all featured calls (both local and Inter-LATA) pass from an originating LEC to an originating toll switching system (OS) within the IXC network for processing and routing to their intended destination. For example, Inter-LATA toll calls pass from the OS within the IXC network to a terminating toll switching system (TS) within the IXC network, either directly, or through one of more via toll switching systems (VSs). From the TS, Inter-LATA toll calls pass to a terminating LEC. Featured calls pass from the originating LEC to the OS within the IXC serving that LEC. If the OS does not possess the requisite call processing capability, (i.e., the OS lacks access to an NCP), then the call passes from the OS to a toll switching system having the requisite processing capability. After processing, the call is routed to its intended destination.

The toll switching system that performs the processing for featured calls will hereinafter be referred to as the "hand-off switching system (HS)." As previously discussed, the OS may serve as the HS, depending on the processing capabilities of the OS. Should the OS not possess the requisite processing capability, then the switching system to which the OS hands off the call becomes the HS, and is said to be "associated with" the OS.

Since all inter-LATA toll and international calls and all featured calls presently pass to the HS within the IXC network, increases in toll and featured call traffic result in an increased load on each HS. To accommodate more traffic, additional toll switching systems must be provided, thereby increasing network costs for the IXC.

Thus, there is a need for a technique for local/toll dynamic routing network integration to integrate class-of-service processing with the local and toll networks to provide efficient dynamic route selection to the destination while making efficient use of service processing capabilities as well as network switching and transport capacity, thereby reducing the burden on IXC toll switching systems without significantly increasing the development cost of local switching systems.

BRIEF SUMMARY OF THE INVENTION

Briefly, in accordance with the invention, a method is provided for routing featured and non-featured calls within a telecommunications network. The network includes at least one local switching system receiving incoming calls, and a plurality of toll switching systems, (including an originating toll switching system associated with the originating local switching system), and at least one data base (i.e., a Network Control Point (NCP)) containing information regarding call processing. The method of the invention is initiated by deriving at the originating local switching system a set of Class-Of-Service (COS) parameters associated with each incoming call. Each incoming call has a Service Identity (SI), Transport Capability (TC) and Routing Pattern Identity (RPI) factor which collectively comprise the COS parameters for that call. The SI is based on the information associated with the line on which the call originates, the dialed digits, as well as the type of call. For example local voice calls will have a characteristic SI factor while long distance calls are characterized by a different SI factor. The TC identifies the transport capability requirement for the call. For example, voice calls have a TC of 64 kbps with echo cancellation, whereas data calls have TCs of 64 kbps, 384 kbps or 1536 kbps, depending on the type of data call, with no echo cancellation. The RPI is a numerical value derived from a mapping of the SI and TC for a particular call. For example, if the TC and SI indicate that an originating call is a voice call, then a distinct RPI is obtained from mapping the particular TC and SI values. A different RPI is obtained from TC and SI values associated with a data call. The RPI governs the routing treatment given to the call in terms of routing priority, bandwidth allocation, traffic data and other parameters and is utilized in selecting an appropriate trunk for routing the call.

From the COS parameters, the originating local switching system determines whether the call is featured or not. Featured calls, which require special data base processing treatment, are routed from the local switching system to its originating toll switching system. If the originating toll switching system has the capability of processing the featured call (i.e., the ability to access the NCP), the originating toll switching system does so. Otherwise, the originating toll switching system passes the call to the HS having such a capability. Following processing, the call is routed to its intended destination.

If the call is not featured (i.e., no specialized data base processing is necessary), the originating local switching system routes the call to its intended destination, thus obviating the need to route the call automatically to an originating toll switching system for processing and routing. For example, the local switching system routes a non-featured international long distance to a gateway international toll switching system. Such routing may be direct, if such a direct link exists between the local switching system and the gateway international toll switching system. If no direct link exists, the local switching system routes the non-featured call through one or more Via toll switching systems that need not necessarily include the originating toll switching system to which the local switching system is associated. In this way, greater flexibility is achieved, and the burden on the originating toll switching systems within the IXC network is reduced.

In particular, a technique called Class-of-Service Automatic Routing (CSAR) allows the local/toll dynamic routing network integration with class-of-service routing capabilities, without requiring large development in the local switches. CSAR provides a simplified implementation of dynamic routing, which builds on capabilities currently implemented in the AT&T toll network, that is, real-time network routing (RTNR) as disclosed in U.S. Pat. No. 5,101,451, "Real-Time Network Routing" (incorporated by reference herein), and Success-To-The-Top (STT) routing, in which STT is also a feature of the AT&T toll network, as disclosed in U.S. Pat. No. 5,559,877, "Automatic Provisioning Of Trunking And Routing Parameters In A Telecommunications Network" (herein incorporated by reference).

RTNR is an example of state dependent routing which uses the exchange of real-time status information through a Common Channel Signaling (CCS) Network to select the best route on a call-by-call basis. STT, on the other hand, is an example of event dependent routing which uses a technique to search routes until a successful route to the destination is found, and that successful route is used for all calls until blocked whereupon a new successful path is sought (thus the name "success-to-the top"). CSAR uses RTNR when both the originating switching system and terminating switching system have RTNR capability, but uses the STT routing method when either the originating switching system or terminating switching system does not have RTNR capability. Furthermore, STT routing and RTNR routing can be combined in CSAR depending on the capabilities of the switches encountered in the call path. CSAR provides local/toll network integration, with class-of-service routing capabilities, yielding the benefits of dynamic routing, which include: (a) improved service quality, (b) increased service flexibility, (c) additional revenue and revenue retention, and (d) cost reduction.

DETAILED DESCRIPTION

Figure 1:
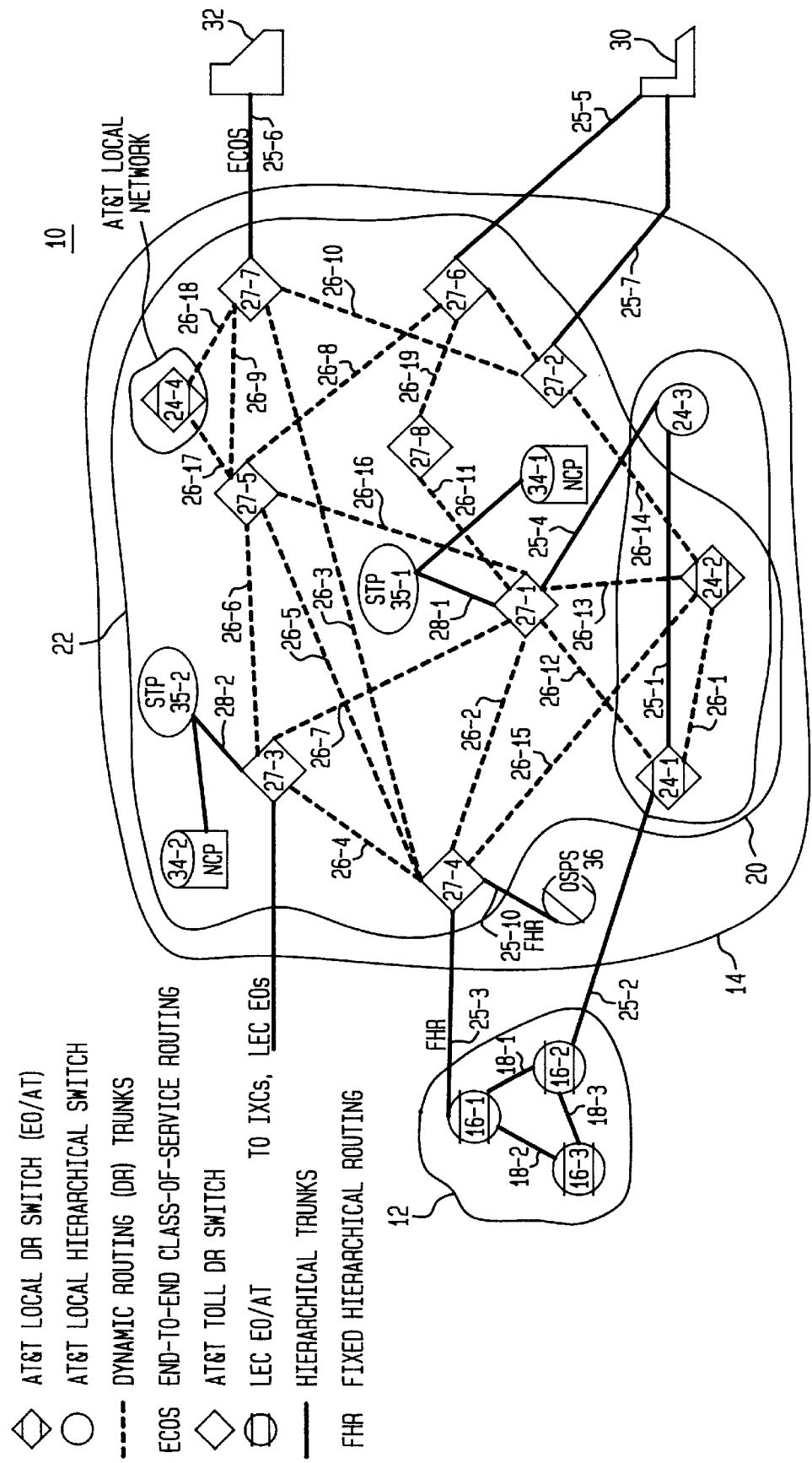
FIG. 1 is a block schematic diagram of a telecommunications network in accordance with the invention.

FIG. 1 illustrates a block schematic diagram of a telecommunications network 10 in accordance with the present invention. The network 10 includes a Local eXchange Carrier (LEC) network 12 and an Inter-eXchange Carrier (IXC) network 14 maintained by an IXC carrier, such as AT&T. The LEC network 12 comprises a plurality of local switching systems 16-1 through 16-3, referred to in the art as End Office/Access Tandems (EO/ATs), that are linked by hierarchical trunks 18-1 through 18-3 for providing local service (i.e., dial tone) to subscribers (not shown). The switching systems 16-1 through 16-3 may each comprise a model 5ESS switching system formerly manufactured by AT&T.

The network 14 comprises two sub-networks 20 and 22. The sub-network 20 comprises a plurality of local (central office) switching systems 24-1 through 24-3, each typically a model 5ESS switching system formerly manufactured by AT&T. Like the local switching systems 16-1 through 16-3, the switching systems 24-1 through 24-3 provide local service (i.e., dial tone) to local subscribers (not shown). As will be discussed in greater detail below, the switching systems 24-1 and 24-2 have dynamic routing capabilities, i.e., the capability of dynamically routing certain calls directly into and through the network 22. The switching system 24-3 lacks dynamic routing capabilities and is linked to the switching system 24-1 via a first hierarchical trunk 25-1, whereas the switching systems 24-1 and 24-2 are linked to each other via a first dynamic routing trunk 26-1 described in greater detail hereinafter with respect to FIG. 2. In the illustrated embodiment, the dynamically routing local switching system 24-1 is linked to the LEC local network 12 via a hierarchical trunk 25-2

The network 22 shares the dynamically routing local switching systems 24-1 and 24-2 with the network 20. Additionally, the network 22 includes a plurality of toll switching systems 27-1 through 27-8, each typically comprised of toll switching systems, such as the model 4ESS switching system previously manufactured by AT&T. The switching systems 27-1 through 27-8 are linked via dynamic routing trunks, such as trunks 26-2 through 26-11. In the illustrated embodiment, the toll switching system 27-4 serves the LEC network 12 via a fixed hierarchical trunk 25-3. In this way, the LEC switching system 16-1 is said to be "homed" to (and associated with for feature processing by) the toll switching system 27-4. All toll (both inter-LATA as well as international direct-dialed calls) and all featured calls originating in the LEC network 12 pass to the toll switching system 27-4 which serves as the OS for this LEC network. The toll switching systems 27-2 and 27-6 both serve a direct-connect customer 30 via hierarchical trunks 25-7 and 25-5, respectively. In other words, all toll traffic and all featured calls originating at the direct connect customer 30 pass directly to the toll switching systems 27-2 and 27-6, rather than to a LEC network. The toll switching system 27-7 is a gateway international toll switching system and serves a foreign administration 32, such as a foreign PTT, via a hierarchical trunk 25-6. For this reason, the toll switching system 27-7 may be referred to as an International Switching Center (ISC). Lastly, the toll switching system 27-1 serves the local switching systems 24-1 and 24-2 in the network 20 via dynamic routing trunks 26-12 and 26-13 and also serves the local switching system 24-3 in network 20 via a hierarchical routing trunk 25-4. In this way, the dynamically-routing local switching systems 24-1 and 24-2 are associated with the toll switching system 27-1 for feature processing, whereas the local switching system 24-3 is homed in a hierarchical routing relationship to the toll switching system 27-1.

The network 14 (including its sub-networks 20 and 22) includes a Common Channel Signaling (CCS) system (not shown) for communicating signaling messages between and among the switching systems to facilitate call completion and data base queries. Such signaling systems are well known in the telecommunications art. An example of a well-known signaling system in the AT&T Common Channel Signaling System 7.

One or more of the toll switches 27-1 through 27-8 within the network 22 may be linked via the CCS Network to separate data bases, referred to as Network Control Points (NCPs) that contain information regarding the manner in which featured calls should be processed. Featured calls are those calls that require special processing not normally performed in the toll switching systems themselves. Examples of featured calls include: 500, 700, 800, and 888 calls, Operator calls, and local calls associated with Loop Resale. (Operator calls are typically handled by an Operator Services Position System (OSPS) 36 linked to toll switching system 27-4 by a hierarchical trunk 25-10.) In contrast, non-featured calls do not typically require special processing (i.e., access by the toll switching system to an NCP). Non-featured calls include local calls, direct-dialed domestic and international long distance calls, and direct-dialed data calls. In the illustrated embodiment, the toll switching systems 27-1 and 27-3 are linked to NCPs 34-1 and 34-2, respectively, via signaling links 28-1 and 28-2, respectively, which, in turn, route data base query messages via signal transfer points (STPs) 35-1 and 35-2 within the CCS network to NCPs 34-1 and 34-2, respectively. Note that either NCP 34-1 or 34-2 is accessible to any of the toll switching systems 27-1 through 27-8 via the CCS network.

In present day telecommunications networks, both featured calls and non-featured toll calls originating at a local switching system are routed to an originating toll switching system to which that local switching system is associated. It is the originating toll switching system that establishes the nature of the call, queries the appropriate data bases and then routes the call. There are several disadvantages with this approach. Increases in featured and non-featured toll traffic increase the load on the originating toll switches, thus necessitating an increase in the originating toll switching system capacity. Moreover, the current approach does not achieve the most efficient use of switching and transport facilities.

In accordance with the invention, local and toll dynamic routing integration is achieved by allowing local switching systems 24-1 and 24-2 to dynamically route non-featured toll calls into and within the network 22. Such routing achieves greater efficiency and capacity relief for those of the toll switching systems 27-1 through 27-8 that serve as originating toll switching systems. To facilitate such local and toll dynamic routing integration, each of the dynamically routing local switching systems 24-1 and 24-2 has the ability to distinguish between featured and non-featured calls. Non-featured toll calls are routed directly by each of the dynamically routing local switching systems 24-1 and 24-2 to their intended destination without the necessity for the originating toll switching system 27-1 associated with each local switching system to perform call routing. For example, the local switching system 24-2 routes international long distance calls, in accordance with the invention, to the toll switching system 27-7 via the switching systems 27-2 and 27-4, rather than necessarily routing the call to the originating toll switching system 27-1 as was required in the prior art.

Class-of-Service Automatic Routing (CSAR) is used to route calls, for example, from local switching system 24-1 to the ISC 27-7. CSAR allows the local switching system 24-1 to route calls to ISC 27-7 according to whether the local switching system 24-1 has, for example, real-time network routing (RTNR) capabilities or success-to-the-top (STT) routing capabilities. RTNR uses the exchange of real-time status information through CCS messages to select the best route on a call-by-call basis. STT, on the other hand, uses a technique to search routes until a successful route to the destination is found, and that successful route is used for all calls until blocked whereupon a new successful path is sought. CSAR uses RTNR when both the originating switching system and terminating switching system have RTNR capability, but uses the STT routing method when either the originating switching system or terminating switching system does not have RTNR capability. Furthermore, STT routing and RTNR routing can be combined in CSAR depending on the capabilities of the switching systems encountered in the call path. For example, if the switching system 24-2 is routing a call to Foreign Administration 32, and the switching system 24-2 and the ISC 27-7 both have RTNR capability, then the switching system 24-2 will route the call to the ISC 27-7 by first querying the ISC 27-7 for status of the trunk groups 26-3 and 26-10, and then using the status information along with its own status of trunk groups 26-15 and 26-14 to select the least loaded path, either path 24-2 via toll switching system 27-2 to the destination ISC 27-7 or path 24-2 via toll switching system 27-4 to the destination ISC 27-7.

If either local switching system 24-2 or the ISC 27-7 have STT capability only, then the switching system 24-2 will route the call to the ISC 27-7 by first using the path that was last successful in routing a call to the ISC. If, for example, the path 24-2 via switching system 27-2 to ISC 27-7 is blocked, the switching system 27-1 will try the path 24-2 via the switching system 27-4 to the ISC 27-7. If the latter path is successful, it is stored as the STT via path, and used first on the next call from switching system 24-2 to the ISC 27-7.

As a second example, consider a non-featured call routed from local switching system 24-2 to local switching system 24-4 across the dynamic network 22. Suppose the switching system 24-2 and switching system 24-4 both have RTNR capability, then switching system 24-2 could route the call to switching system 24-4, if there were any two-link connectivity, by first querying switching system 24-4 for status of the trunk groups and then using its own status information to select the least loaded path. However in the illustrated embodiment, there are no two-link paths between switching system 24-2 and switching system 24-4. In this instance, switching system 24-2 can use RTNR to route the call first to either switching system 27-5 or to the switching system 27-7. Switching system 24-2 will route the call to the switching system 27-7 by first querying the switching system 27-7 for status of trunk groups 26-3 and 26-10, and then using the status information along with its own status of trunk groups 26-15 and 26-14 to select the least loaded path, either path 24-2 via toll switching system 27-2 to the switching system 27-7 or the path 24-2 via the toll switching system 27-4 to the switching system 27-7. If both paths are blocked to the switching system 27-7, then switching system 24-2 will route the call to the switching system 27-5 by first querying the switching system 27-5 for status of trunk groups 26-5 and 26-16, and then using the status information along with its own status information for the trunk groups 26-15 and 26-13 to select the least loaded path, either path 24-2 via the toll switching system 27-4 to destination toll switching system 27-5, or the path 24-2 via the toll switching system 27-1 to the toll switching system 27-5. Once the call reaches either switching system 27-7 or switching system 27-5, it can be routed using RTNR from that switching system to the destination switching system 24-4 in a similar manner.

As a third example, consider a call routed from local switching system 24-2 to the local switching system 24-4 across the dynamic network 22. Suppose that switching system 24-2 only has STT capability. As in the second example since there are no two-link paths between the switching system 24-2 and the switching system 24-4, the switching system 24-2 can use STT to route the call first to either the switching system 27-5 or the switching system 27-7. The Switching system 24-2 will first try to route the call to the switching system 27-7 if that were the last successful STT path. If the path 24-2, via the toll switching system 27-2 to destination switching system 27-7 is the STT path, and that is blocked, then the path 24-2 via the switching system 27-4 to the switching system 27-7 is tried. If both paths are blocked to the switching system 27-7, then switching system 24-2 will route the call to the switching system 27-5 by first trying the path 24-2 via the switching system 27-4 to the switching system 27-5, if that were the STT path to switching system 27-5, and if that path is blocked, then trying the path 24-2 via the switching system 27-1 to the destination switching system 27-5.

Once the call reaches either the switching system 27-7 or the switching system 27-5, the call can be routed using RTNR from that switching system to the destination switching system 24-4, since the switching system 27-5, the switching system 27-7, and the switching system 24-4 have RTNR capability. The above examples illustrate how STT routing and RTNR routing can be combined in CSAR depending on the capabilities of the switches encountered in the call path. In this manner CSAR provides local/toll network integration, with class-of-service routing capabilities, yielding the benefits of dynamic routing.

To accomplish dynamic routing, each of the dynamically routing local switching systems 24-1 and 24-2 derives for each originating call a set of Class-Of-Service (COS) parameters. The COS parameters include a Service Identity factor (SI), a Transport Capability (TC) factor and a Routing Pattern Identity (RPI) factor. The SI factor indicates the type of service associated with the call and is based on information associated with the line or trunk on which the call originates as well as the dialed digits. For example, each of the dynamically routing local switching systems 24-1 and 24-2 receives voice calls on voice trunks, although the nature of the trunk on which calls are received is not necessarily definitive of the call type. For example, a subscriber could initiate a data call on an Integrated Services Digital Network (ISDN) access trunk, for example, via a personal computer. The dialed digits associated with an originating call are also used to determine the SI factor.

The TC identifies the transport capability requirement for the call. For example, voice calls have a TC of 64 kbps with echo cancellation, whereas data calls have TCs of 64 kbps, 384 kbps or 1536 kbps depending on the type of data call, with no echo cancellation. In practice, the TC is established from the type of trunk on which the call passes to the local switching system, and the bearer capability in the set-up signaling message identifying the call as a voice or data call.

The RPI is a numerical value derived from a mapping of the SI and TC for a particular call. For example, if the TC and SI indicate that an originating call is a voice call, then a distinct RPI is obtained from mapping the particular TC and SI values. A different RPI is obtained from TC and SI values associated with a data call. As will be discussed in greater detail below, the RPI factor is utilized in connection with call routing to select trunks and to establish call priority.

Figure 2:
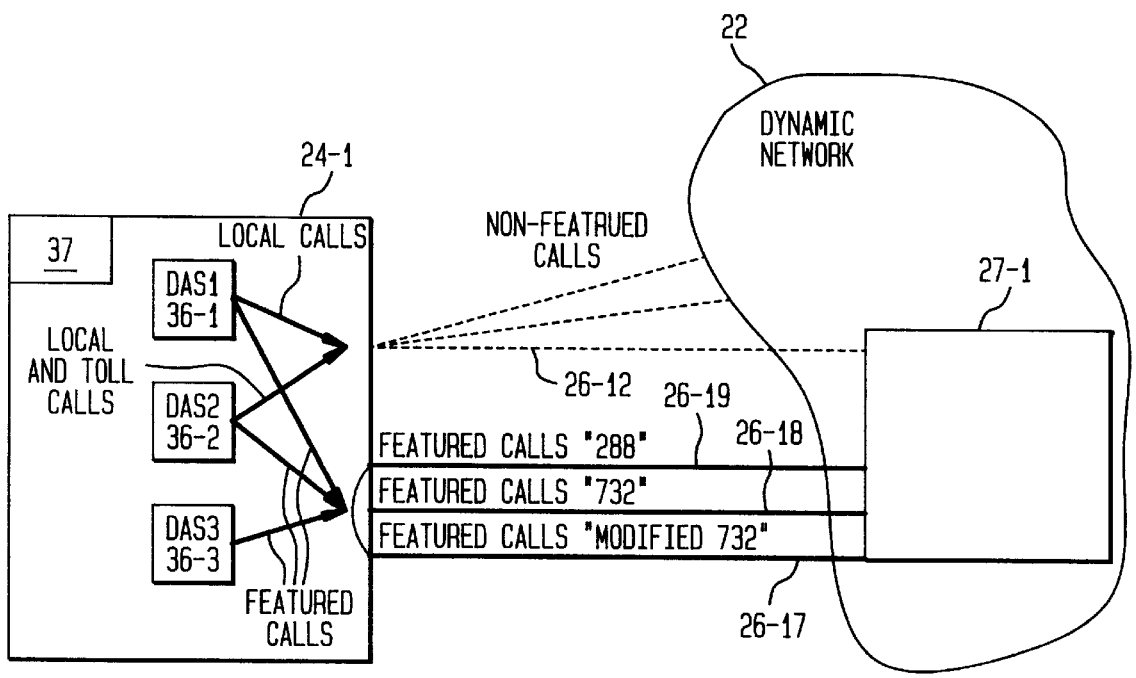
FIG. 2 is a block schematic diagram of a portion of the network of FIG. 1 showing the connection between a local switching system and a dynamic network.

To determine the SI factor from the dialed digits, each dynamically routing local switching system, such as switching system 24-1 of FIG. 2, could include, in one embodiment, one or more Digit Analysis Selector (DAS) pattern detectors 36-1 through 36-3. Although three such DAS pattern detectors are shown in FIG. 2, a greater or lessor number may be provided. Each of the DAS pattern detectors 36-1 through 36-3 detects the pattern of dialed digits and determines from that pattern the type of call (local, toll or featured), which, in combination with the nature of the line or trunk on which the call arrived, establishes the SI factor.

Also, each DAS pattern detector determines a Routing Index (RI) in connection with the call type. The RI determines the type of routing treatment (featured, and handed off to a hand-off switch, or non-featured, and routed directly to the destination) for the call. In accordance with the invention, at least one of the DAS pattern selectors 36-1 through 36-3 establishes dynamic routing for non-featured toll calls. In other words, non-featured toll calls originating at the local switching system 24-1 of FIG. 2 are dynamically routed via the dynamic routing trunk 26-12 into and within the network 22. In contrast, the same DAS pattern selector establishes an RI dictating direct dynamic routing to the switching system 27-1 for feature processing for featured calls. In other words, the dynamically routing local switching 24-1 system of FIG. 2 routes featured toll calls via one of dynamic trunks 26-17 through 26-19 to the hand-off toll switching system 27-1. Thus, in this example, featured calls are dynamically routed directly to switching system 27-1, in contrast to non-featured toll calls which are routed to their destination. It is also possible in other embodiments to hand-off featured calls to one of several hand-off toll switches. For example, in FIG. 1, local switching system 24-2 could employ dynamic routing to hand-off featured calls to either hand-off switching system 27-1 or 27-4, using either one or two-link connections to these hand-off switches.

The DAS pattern selectors $36_1$–$36_3$ could be stand alone devices, or their functionality could be integrated within a processor 37 within the switching system (see FIG. 2). The processor 37 performs certain tasks in connection with call routing, such as mapping the SI and TC values to obtain the RPI value, which, as will be described, allows the switching system to accomplish Class-Of-Service Automatic Routing (CSAR) for non-featured calls.

The dynamically routing trunk 26-12 through 26-19 of FIG. 2 are conventional, call carrying trunks or their equivalent (e.g., routed-over optical fibers or other communication channels). The dynamically routing trunk 26-12 differs from the dynamically routing trunks 26-17 through 26-19 by the nature of the calls each carries. The dynamically routing trunk 26-12-carry direct dynamically-routed non-featured calls directly into and within the network 22 and dynamically routing trunks 26-17 through 26-19 carry direct dynamically routed featured calls to a hand-off switching system, from their respective dynamically routing local switching systems for routing through the network 22 to the appropriate destination. In contrast, the hierarchical trunk 25-4 of FIG. 1 carries both featured as well as non-featured toll calls from the local switching system 24-3 of FIG. 1 to its originating toll switching system 27-1 of FIG. 1. Upon receiving such calls, the toll switching system 27-1 derives the necessary COS parameters to perform the appropriate routing determination. In practice, the non-dynamic local switching system 24-3, as well as the dynamically-routed local switching systems 24-1 and 24-2, typically do not route local non-featured calls into the dynamic network 22. Rather, such calls pass to the LEC network 12 (or to another LEC network) as appropriate.

In practice, the local switching systems 24-1 and 24-2 of FIG. 1 route both featured and non-featured toll calls on their dynamic routing trunks 26-12 and 26-13, respectively, to the toll switching system 27-1. However, in accordance with the invention, non-featured toll calls routed to the toll switching system 27-1 via the dynamically routing trunk 26-12 are treated differently than the calls received from the switching system 24-3. As described, the dynamically routing local switching systems 24-1 and 24-2 derive the COS parameters and establish the appropriate routing for non-featured toll calls. Thus, for non-featured toll calls received on the dynamically routing trunk 26-12, switching system 27-1 knows that the local switching system has already determined the routing. Under such conditions, the switching system 27-1 may merely act as a via switching system, rather than as an originating switching system as is required for the calls received from the local switching system 24-3 that lacks dynamic routing capability.

As discussed above, the toll switching system 27-1 knows that routing information for non-featured toll calls received from the local switching systems 24-1 and 24-2 has been established because such calls have arrived via the dynamic routing trunks 26-12 and 26-13, respectively. However, the switching system 27-1 does not necessarily have to rely on the trunk identity to differentiate dynamically-routed non-featured toll calls from featured calls. For example, a signaling message from a local switching system, say 24-1, could identify a particular call as being a dynamically-routed non-featured toll call from a featured call.

As discussed previously, the dynamically routing local switching systems 24-1 and 24-2 obtain the RPI factor from a mapping of the TC and SI values. Table I lists exemplary RPI values for different SI and TC values.

TABLE I

| RPI Index | RPI | Service Identity (SI) | TC |
|---|---|---|---|
| 1 | Voice | 800, 900 and SDN | Voice |
| 2 | International Voice | International Long Distance - Outbound | Voice |
| 3 | 64-Clear Data | Switched Data Service, Switched Data International-Outbound Local Data | 56/64 kbps |
| 4 | 384 Clear Data | Switched Data Service, Switched Data International Service-Outbound Local Data | 384 kbps |
| 5 | 1536 Clear Data | Switched Data Service, Switched Data International-Service-Outbound Local Data | 1536 kbps |
| 6 | 64 Voice Key | SDN-Key | Voice |
| 7 | 64 Clear key Data | Software Defined Digital Network | 56/64 kbps |
| 8 | Long Distance Service | Long Distance Service (Business and Residential) Local Voice | Voice |
| 9 | Government Emergency Telephone Service | Government Emergency Telephone Service | Voice |

As discussed previously, the RPI value obtained from mapping the SI and TC factors in the manner indicated in Table I may be used in connection with trunk selection for routing purposes. A call having an associated RPI factor of five indicates that the trunk needed to route the call must have a TC of 1536 kbps. Any trunk not possessing that capacity is unsuitable for that call and should not be selected. Conversely, an RPI of one indicates a voice call and any trunk capable of carrying voice calls may be selected.

The RPI factor is also useful for determining call priority. For example, Government Emergency Telephone Service calls, while voice calls, are typically accorded an RPI of nine, in contrast to International Long Distance Voice Calls that have an RPI factor of two. Some RPI values, such as an RPI of nine associated with Government Emergency Telephone Service calls, take priority over, or have key service, over other calls having an RPI factor designated as normal priority.

As may be appreciated, using the RPI factor to select dynamically routing trunks for routing purposes allows the network 22 to route calls automatically, based on Class-Of-Service. Calls having a key service designation may be routed with a higher priority. Moreover, routing calls on Class-Of-Service (as determined by the RPI factor) assures proper trunk selection for the call.

In another implementation of the invention, the local switching systems may have full capability to process both featured and non-featured calls, and therefore do feature processing, rather than requiring a hand-off switch to do feature processing. In this case, CSAR path selection is used from the local switching system to the destination within the dynamic routing network for both featured and non-featured calls, rather than use CSAR to route calls first to the hand-off switching system.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for routing incoming featured and non-featured calls within a telecommunications network including at least one local switching system that receives said featured and non-featured incoming calls, and a plurality of toll switching systems interconnected by routing trunks, with at least one toll switching system associated with the local switching system for processing calls to perform call routing within the network, comprising the steps of:

deriving at the local switching system a set of Class of Service (COS) parameters associated with an incoming call, determining from the derived COS parameters whether said incoming call is featured or non-featured;

routing featured calls from the local switching system to said one toll switching system associated with the local switching system so that said one toll switching system processes featured calls and routes said featured calls their destination; and establishing at said local switching system, call routing for said non-featured calls in accordance with the COS parameters; and routing, from said local switching system, said non-featured calls to their intended destination.

2. The method according to claim 1 wherein the COS parameters include: a Service Identity factor (SI) identifying a type of service associated with said incoming call, a Transport Capability factor (TC) indicating a trunk capacity requirement for carrying said incoming call and a Routing Pattern Identity (RPI) factor obtained from said TC and SI factors.

3. The method according to claim 2 wherein the SI is obtained, at least in part, from said incoming call's dialed digits.

4. The method according to claim 2 wherein the local switching system receives said incoming call on an incoming trunk and wherein the TC is determined in accordance with characteristics of said incoming trunk.

5. The method according to claim 4 wherein SI factor is determined, at least in part, in accordance with the type of incoming trunk on which said incoming call arrived at said local switching system.

6. The method according to claim 2 wherein the RPI factor is obtained from a mapping of the SI and TC factors.

7. The method according to claim 1 wherein the local switching system routes a non-featured toll call to a toll switching system to which the local switching system is not homed.

8. The method according to claim 2 wherein the local switching system selects routing trunks for routing non-featured calls between toll switching systems in accordance with at least one of the COS parameters associated with each non-featured call.

9. The method according to claim 8 wherein the local switching system selects routing trunks for routing non-featured calls between toll switching systems in accordance with the RPI factor.

10. The method according to claim 1 further including a second local switching system and wherein said first local switching system routes local non-featured calls to said second local switch.

11. The method according to claim 8 wherein the trunk selection is made using state-dependent routing in combination with event dependent routing.

12. The method according to claim 2 wherein the switching systems receive signaling messages and wherein one of said signaling messages indicates whether the call is featured or not.

13. A method for routing incoming featured and non-featured calls within a telecommunications network including at least one local switching system that receives said featured and non-featured incoming calls, and a plurality of toll switching systems interconnected by routing trunks, comprising the steps of:

deriving at the local switching system a set of Class of Service (COS) parameters associated with an incoming call, determining from the derived COS parameters whether said incoming call is featured or non-featured;

processing featured calls at the local switching system when the calls are determined to be featured from the derived COS parameters; and establishing at said local switching system, call routing for both featured and non-featured calls in accordance with the COS parameters; and routing, from said local switching system, said non-featured and featured calls to their intended destination.

14. A telecommunications network comprising:

at least one local switching system for receiving featured and non-featured incoming calls each comprised of dialed digits;

a plurality of routing trunks;

a plurality of toll switching systems interconnected by said routing trunks, with at least one toll switching system coupled to said local switching system by at least one of said routing trunks so that said one toll switching system can receive calls from the local switching system and hand-off said calls, if necessary, to another toll switching system having the capability to process said incoming calls and to perform call routing within the network;

wherein the improvement comprises:

means within said one local switching system for deriving a set of Class-Of-Service parameters for each incoming call; and means within said one local switching system responsive to the Class-Of-Service parameters for:

(1) determining whether the call is featured or non-featured, (2) for determining a first routing treatment for said featured calls and a second routing treatment for non-featured calls; and (3) routing featured calls to said one toll switching system associated with said local switching system in accordance with said first routing treatment and routing non-featured calls to one of said plurality of toll switches in accordance with said second routing treatment.

15. The apparatus according to claim 14 wherein said means for deriving the COS parameter comprises at least one Digit Analysis Selection (DAS) pattern detector for obtaining said COS parameters for each incoming call from the dialed digits of said call.

16. The apparatus according to claim 14 wherein said means for determining and routing comprises a processor.

17. The apparatus according to claim 14 wherein a pair of routing trunks couple the local switching system to said one toll switching system, and wherein at one of said pair of trunks comprises a dynamic trunk that routes featured calls to a hand-off switch (HS) for feature processing while the other trunk comprises a dynamically routing trunk for routing non-featured calls.

18. A telecommunications network comprising:

at least one local switching system for receiving featured and non-featured incoming calls each comprised of dialed digits;

a plurality of routing trunks;

a plurality of toll switching systems interconnected by said routing trunks, with at least one toll switching system coupled to said local switching system by at least one of said routing trunks so that said one toll switching system can receive calls from the local switching system and hand-off said calls, if necessary, to another toll switching system having the capability to process said incoming calls and to perform call routing within the network;

wherein the improvement comprises:

means within said one local switching system for deriving a set of Class-Of-Service parameters for each incoming call; and means within said one local switching system responsive to the Class-Of-Service parameters for:

(1) determining whether the call is featured or non-featured, (2) processing featured calls; and (3) routing featured and non-featured calls to one of said plurality of toll switching systems into and within the network.

* * * * *